(12) United States Patent
Virus et al.

(10) Patent No.: US 12,186,987 B2
(45) Date of Patent: Jan. 7, 2025

(54) METHOD FOR PRODUCING AN ADHESIVE FILAMENT, AND ADHESIVE FILAMENT

(71) Applicant: TESA SE, Norderstedt (DE)

(72) Inventors: Frank Virus, Hamburg (DE); Michael Schwertfeger, Hamburg (DE); Manuel Bendeich, Hamburg (DE)

(73) Assignee: TESA SE, Norderstedt (DE)

( * ) Notice: Subject to any disclaimer, the term of this patent is extended or adjusted under 35 U.S.C. 154(b) by 621 days.

(21) Appl. No.: 17/416,252

(22) PCT Filed: Dec. 17, 2019

(86) PCT No.: PCT/EP2019/085754
§ 371 (c)(1),
(2) Date: Jun. 18, 2021

(87) PCT Pub. No.: WO2020/127348
PCT Pub. Date: Jun. 25, 2020

(65) Prior Publication Data
US 2022/0072789 A1 Mar. 10, 2022

(30) Foreign Application Priority Data
Dec. 19, 2018 (DE) ...................... 10 2018 222 371.8

(51) Int. Cl.
*B29C 64/314* (2017.01)
*B29K 105/00* (2006.01)
(Continued)

(52) U.S. Cl.
CPC ............ *B29C 64/314* (2017.08); *B33Y 40/10* (2020.01); *B33Y 70/00* (2014.12); *C09J 7/10* (2018.01); *C09J 11/04* (2013.01); *C23C 4/11* (2016.01); *C23C 4/134* (2016.01); *B29K 2105/0097* (2013.01); *C09J 2301/302* (2020.08)

(58) Field of Classification Search
None
See application file for complete search history.

(56) References Cited

U.S. PATENT DOCUMENTS 5,121,329 A 6/1992 Crump
6,138,441 A 10/2000 Kik et al.
(Continued)

FOREIGN PATENT DOCUMENTS

CA 3006443 A1 12/2018
CN 101094791 A 12/2007
(Continued)

OTHER PUBLICATIONS

Machine Translation of JP2018083870 (Year: 2018).*
(Continued)

*Primary Examiner* — Shawn Mckinnon
(74) *Attorney, Agent, or Firm* — Norris McLaughlin, P.A.

(57) ABSTRACT

Methods for producing an adhesive filament from a pressure-sensitive adhesive, devices for carrying out the methods, adhesive filaments, adhesive rollers, and printed elements are provided. The methods comprise providing the pressure-sensitive adhesive; forming the pressure-sensitive adhesive to a material strand and treating at least a partial region of the surface of the material strand with a plasma stream.

15 Claims, 3 Drawing Sheets

(51) Int. Cl.
- *B33Y 40/10* (2020.01)
- *B33Y 70/00* (2020.01)
- *C09J 7/10* (2018.01)
- *C09J 11/04* (2006.01)
- *C23C 4/11* (2016.01)
- *C23C 4/134* (2016.01)

(56) References Cited

U.S. PATENT DOCUMENTS

| | | |
|---|---|---|
| 6,155,029 A | 12/2000 | Jian |
| 6,527,897 B1 | 3/2003 | Ecker et al. |
| 10,501,869 B2 | 12/2019 | Van Der Schaaf et al. |
| 2006/0093764 A1 | 5/2006 | Metha et al. |
| 2006/0205176 A1 | 9/2006 | Butzek et al. |
| 2011/0256395 A1 | 10/2011 | Zmarsly et al. |
| 2018/0363142 A1* | 12/2018 | Bendeich .................. C09J 7/38 |

FOREIGN PATENT DOCUMENTS

| | | | |
|---|---|---|---|
| CN | 101423739 | * | 5/2009 |
| CN | 102245727 A | | 11/2011 |
| CN | 107849743 A | | 3/2018 |
| DE | 3138222 C1 | | 5/1983 |
| DE | 19820366 C2 | | 11/1999 |
| DE | 20316092 U1 | | 3/2005 |
| EP | 0497996 B1 | | 4/1994 |
| EP | 1 349 900 B1 | | 2/2007 |
| EP | 329 889 A1 | | 6/2011 |
| EP | 2329889 | * | 6/2011 |
| EP | 1 562 751 B1 | | 1/2013 |
| EP | 2 985 327 A1 | | 2/2016 |
| JP | 2002-338933 A | | 11/2002 |
| JP | 2018083870 | * | 5/2018 |
| WO | 2011/067213 A1 | | 6/2011 |
| WO | WO2019164678 | * | 8/2019 |

OTHER PUBLICATIONS

Machine Translation of CN101423739 (Year: 2009).*
Machine Translation of EP2329889 (Year: 2011).*
English translation of Chinese First Office Action dated Aug. 3, 2022, in connection with Chinese Patent Application No. 201980091900.2.
English translation of Chinese First Office Action dated Jun. 17, 2021, in connection with Chinese Patent Application No. 201911314987.3.
International Search Report dated Apr. 6, 2020, in connection with PCT International Application No. PCT/EP2019/085754.
English translation of International Search Report dated Apr. 6, 2020, in connection with PCT International Application No. PCT/EP2019/085754.
Written Opinion in connection with PCT International Application No. PCT/EP2019/085754.
Excerpt of German Search Report dated Sep. 25, 2019, in connection with German Application No. 10 2018 222 371.8.
Zhou, et al., "Principles and Equipment for Pharmaceutical Engineering", 2nd edition, The Medicine Science and Technology Press of China, pp. 58-60, Aug. 2018.

* cited by examiner

METHOD FOR PRODUCING AN ADHESIVE FILAMENT, AND ADHESIVE FILAMENT

This application is a 371 of PCT/EP2019/085754, filed Dec. 17, 2019, which claims foreign priority benefit under 35 U.S.C. § 119 of the German Patent Application No. 10 2018 222 371.8, filed Dec. 19, 2018, the disclosures of which are incorporated herein by reference.

The invention relates to a method for producing a filament of adhesive. The invention also relates to an apparatus for implementing the method, to a filament of adhesive, to a roll of adhesive, and also to a printed element.

In the field of additive manufacturing there are multiple methods by which articles can be generatively fabricated. They are used for producing prototypes, tools, and end products. Typically, in an additive manufacturing method, workpieces are built up layer by layer on a construction platform. Manufacture is therefore not a process of removing material from a solid body as in the case of milling, for example, but rather a process of adding material—hence "additive". If end products are being produced directly, the process is referred to as direct manufacturing. An end product in this context means a saleable product used for its intended purpose and having production-run properties from a run of one upward.

The layerwise construction of the end products is accomplished by addition of material or by phase transition of a material from the liquid or pulverulent state to the solid state. Manufacturing takes place typically without the use of molds and specific tools. Well known methods include Fused Deposition Modeling (FDM® or else Fused Filament Fabrication—FFF), in which a heated print head with an extruder die causes a thermoplastic material to melt, and the softened or liquified material is deposited on a construction platform or for further layered construction on a product. This method is also referred to commonly as "3D printing". The thermoplastic material is supplied to the print head and to the extruder die located therein typically in the form of what is called a filament. In this case a filament is unwound on a coil and supplied via guide loops and/or guide rollers to a heated print head. Filaments typically consist of thermoplastics such as polyethylene, polypropylene, polylactide or ABS.

Whereas processing with thermoplastics is already very widespread, the use of materials possessing pressure-sensitive adhesion, i.e., pressure sensitive adhesives, is hardly established.

U.S. Pat. No. 5,121,329 A discloses an apparatus for generating three-dimensional articles by applying material delivered from an output head at a controlled rate to a base element. These three-dimensional articles may be generated by deposition of repeated layers of solidifying material, where the materials used may be self-hardening waxes, thermoplastic resins, molten metals, two-part epoxies, foaming plastics, or glass. Hotmelt adhesives may also be used.

The publication EP 1 349 900 B1 discloses a method and a composition for the inkjet printing of pressure sensitive adhesive specimens. The compositions generally comprise a curable liquid composition (i.e., pressure-sensitive adhesive precursor). After curing, a pressure-sensitive adhesive is formed.

The publication EP 1 562 751 B1 discloses a method for producing an adhesive component. The pressure sensitive adhesive base possesses a low viscosity and can be applied, for example, using a slot die or by spraying. After the pressure sensitive adhesive base has been applied it is crosslinked until a predetermined viscosity is reached. Crosslinking is accomplished, for example, by irradiation or by heating.

These aforementioned methods are known as poly-jet modeling or multi-jet modeling, in which a construction process takes place layer by layer by means of line-by-line application of a crosslinking material, which is UV-crosslinking or heat-crosslinking, for example. It involves applying exclusively low-viscosity adhesives to a component or to a carrier material and then raising the viscosity of the adhesive in a crosslinking reaction which is externally induced.

The publication EP 2 985 327 A1 discloses a method and an apparatus for producing a pressure sensitive adhesive layer, consisting of the steps of: applying a crosslinkable polymer composition into a cavity of a printing roll, inducing or effecting a crosslinking reaction for generating an at least partly crosslinked pressure sensitive adhesive layer, and removing the at least partly crosslinked pressure sensitive adhesive layer from the cavity.

The publication DE 198 20 366 C2 discloses filling stencils for pressure sensitive adhesive layers with a reaction medium and subsequently curing the material in the absence of oxygen in a UV section.

These aforesaid methods are printing operations, in which shaped parts of adhesive are provided by the taking of impressions or the filling out of hollow molds or stencils, respectively.

A disadvantage is that the known methods do not make it possible to process pressure sensitive adhesives of relatively high viscosity by the fused deposition modeling method and to apply the pressure sensitive adhesive layer by layer and with sharply defined contours to a component or carrier.

In principle it is a major and to date unresolved problem to use pressure sensitive adhesives in an additive manufacturing method for layer-by-layer production of printed elements. A particular problem is that pressure sensitive adhesive materials cannot be conveyed, or not adequately conveyed, within a manufacturing machine for additive manufacturing, since they stick together immediately. A further problem is the transport and storage of pressure sensitive adhesive filaments, since they stick to themselves or to other objects immediately on contact with them.

The object on which the invention is based is therefore that of providing a method as specified at the outset for producing an adhesive filament, which can be processed without sticking.

In a second aspect, it is an object of the present invention to provide an adhesive filament as stated at the outset that is easy to produce and can be processed without sticking.

In a further aspect it is an object of the present invention to provide an adhesive filament as specified at the outset that can be used in existing manufacturing machines and enables the production of printed elements.

The objects are achieved by the method for producing a filament of adhesive as set forth herein. Advantageous developments are also set forth herein.

The invention accordingly relates to a method for producing a filament of adhesive from a pressure sensitive adhesive, with the steps of:
a) providing the pressure sensitive adhesive,
b) shaping the pressure sensitive adhesive into a strand of material,
c) treating at least a subregion of the surface of the material strand with a plasma stream, the plasma stream emerging from an opening of a plasma nozzle and being passed over at least one subregion of the surface of the material strand.

A material strand refers to a material shaped in strand form, meaning that its extent in the longitudinal direction is greater by a multiple than its extent perpendicular to the longitudinal direction. The strand form of a material strand is particularly suitable for use in additive manufacturing machines which operate according to the fused deposition modeling method. Such material strands are produced preferably by extrusion processes and are also known as plastic filament. The skilled person is also aware of the term "3D printers" to refer to such manufacturing machines. Such manufacturing machines typically employ plastic filaments. The material strand preferably has a circular cross section. With particular preference the diameter is a number of millimeters. A material strand may alternatively have other cross-sectional shapes, examples being square, rectangular, pentagonal, hexagonal, heptagonal or octagonal cross sections. The material strand may also have a complex shaping, consisting of a plurality of basic geometric shapes.

A pressure sensitive adhesive, in line with the general understanding of the skilled person, is a viscoelastic composition which in the set, dry state at room temperature is permanently tacky and remains adhesive, and can also be bonded by gentle applied pressure to a multiplicity of substrates, such as, for example, plastics, metals, glass, stone, wood or paper.

The pressure sensitive adhesive preferably comprises at least one synthetic rubber, with the preferred synthetic rubber or the preferred synthetic rubbers being selected from the group of statistically copolymerized styrene-butadiene rubbers (SBR), styrene-ethylene-butadiene diblock and triblock copolymers (SEBS), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes and/or blends thereof.

The pressure sensitive adhesive preferably comprises at least one resin component. Peel adhesion-boosting (tackifying) resins in this case are included advantageously in a fraction of up to 70 wt %, based on the overall mixture of the pressure sensitive adhesive. Tackifying resins for addition that can be used include without exception all tackifier resins already known and described in the literature. Representatives include the pinene and indene resins and rosins, their disproportionate, hydrogenated, polymerized and/or esterified derivatives and salts, the aliphatic and aromatic hydrocarbon resins, terpene resins and terpene-phenolic resins, and also C5, C9 and other hydrocarbon resins. Any desired combinations of these and further resins may be used in order to establish the properties of the resultant pressure sensitive adhesive in accordance with requirements. Generally speaking, it is possible to use all resins that are compatible (soluble) with the nitrile rubbers, particular reference being made to all aliphatic, aromatic and alkylaromatic hydrocarbon resins, hydrocarbon resins based on pure monomers, hydrogenated hydrocarbon resins, functional hydrocarbon resins, and also natural resins. Express reference may be made to the depiction of the state of knowledge in "Handbook of Pressure Sensitive Adhesive Technology" by Donatas Satas (van Nostrand, 1989).

The weight fraction of the resin component in the pressure sensitive adhesive is between 70 and 30 wt %. The weight fraction is preferably between 60 wt % and 40 wt %. In one particularly preferred embodiment the weight fraction of the resin component in the pressure sensitive adhesive is between 55% and 45%.

The resin component may also be a reactive resin. One very preferred group of reactive resins comprises epoxy resins. The molecular weight MW of the preferred epoxy resins varies from 100 g/mol up to a maximum of 10 000 g/mol for polymeric epoxy resins. The epoxy resins comprise, for example, the reaction product of bisphenol A and epichlorohydrin, epichlorohydrin, glycidyl esters, the reaction product of epichlorohydrin and p-aminophenol.

The term "treating" is intended in the sense of the invention to denote the effect of a plasma stream on at least one subregion of a surface of the material strand. The surface means the surface of the material strand that extends perpendicular to the longitudinal direction of the material strand. In the course of transport within a manufacturing machine, this surface typically comes into contact with parts of the machine, and without treatment in the invention would therefore immediately adhere to the machine. End faces of the material strand, as formed, for example, by the separation of the material strand into lengths, may likewise be embraced by the term "surface", however.

As a result of the treatment, the pressure sensitive adhesiveness of the surface of the material strand is less strongly pronounced, meaning that the tack is made lower or is even reduced to an extent such that there is no longer any tack. The "tack" is the term used by a skilled person to refer to the capacity of pressure sensitive adhesives to cling to a multiplicity of materials on contact. This clinging may be accomplished with or else without additional exposure to pressure (pressing on). Tack is also known to the skilled person as "stickiness". A variety of methods are in existence for ascertaining the tack of a pressure sensitive adhesive material, such as, for example, ASTM D 3121-94, AFERA-4015, FSTM-9 or PSTC-11. Typically the rolling ball measurement method is used, also known to the skilled person under the designation PSTC-6. With the rolling ball measurement method, a stainless steel ball bearing ball rolls down from a ramp at a height of 65 mm and picks up kinetic energy. At the end of the ramp, the ball rolls over a flatly outstretched pressure sensitive adhesive material, with the ball being braked by the tack. To test an adhesive filament of the invention, the pressure sensitive adhesive material is treated by the method of the invention before the ball is placed on. The distance travelled by the ball up to standstill is measured and is reported in millimeters as the test result. The construction of the ramp and the test arrangement are described in PSTC-6 and are not elucidated further here. Supplementarily to the test definition in PSTC-6, the tack should be ascertained using stainless steel ball bearing balls having a diameter of 7/16 inch and a mass of 5.70 g±0.5 g, which are cleaned prior to a test with acetone, with each stainless steel ball bearing ball being used only once. Because this test method is temperature-sensitive, moreover, testing is carried out at a measuring location temperature and ball temperature of 23° C.±1° C. For pressure sensitive adhesives with a high tack, the measurement results obtained are short rolling distances of the stainless steel ball bearing ball, typically of a few centimeters, whereas, for pressure sensitive adhesives having a low tack, the rolling distances of the stainless steel ball bearing balls are long, typically several 10 cm up to one or a few meters.

For the purposes of this invention, the surface of a pressure-sensitive layer of adhesive is no longer tacky if the rolling distance by the rolling ball method gives a distance of 40 cm or more. In that case the pressure sensitive adhesiveness is so slight that the adhesive filament no longer sticks within the machine when used in a manufacturing machine in accordance with the fused deposition modeling process. The rolling distance is preferably more than 50 cm, and very preferably the rolling distance is more than 60 cm. In that case the tack is reduced to an extent such as to readily enable processing in a manufacturing machine. More particularly, the tack of the adhesive filament of the invention is reduced to an extent such that it is conveyed in a manufacturing machine and supplied to an extruder die.

The method of the invention envisages a plasma treatment which can be implemented through the use of a plasma generator. The plasma generated in a plasma generator emerges as a plasma stream from a plasma nozzle which is arranged in such a way that the plasma stream flows over at least one subregion of the surface of the material strand. It may also be preferable for the emerging plasma stream to flow completely over the material strand, which can be understood as a complete surrounding flow.

In the context of a plasma treatment, a distinction may generally be made between direct corona treatment and indirect, actual plasma treatment. Corona treatment is defined as a surface treatment generated by high alternating voltage between two electrodes and featuring filamentary discharges, with the discrete discharge channels impinging on the surface to be treated (cf. Wagner et al.: "The barrier discharge: basic properties and applications to surface treatment", Vacuum 71, 2003, pp. 417-436). The process gas used may be, in particular, ambient air. With corona treatment, the substrate to be treated—here, the at least one subregion of the surface of the material strand for treatment—is almost always placed in or guided through the discharge space between an electrode and a counter-electrode. This is also defined as "direct" for the physical treatment. In industrial applications in particular, the term "corona" usually refers to electric barrier discharge. In this case at least one of the electrodes consists of a dielectric, in other words of an electrically nonconductive material, or is covered or coated with such a material. In particular, in the case of a corona treatment, the substrate as well may act as the dielectric. In addition, however, a uniform, more intensive corona treatment of materials differing in type, shape and thickness is possible, wherein the corona effect on the surface of the material to be treated is completely avoided.

EP 0497996 B1, for example, selects a double pin electrode, with each pin electrode having a separate channel for the application of pressure. Between the two tips of the electrodes there is a corona discharge, which ionizes the gas stream flowing through the channels and converts it into a plasma. This plasma then reaches the surface to be treated, where it carries out, in particular, a surface oxidation, which improves the wettability of the surface. The nature of the physical treatment is referred to in the context of the present invention as "indirect", since the treatment is not performed at the location at which the electrical charge is generated.

In the text below, any reference to a plasma treatment should be assumed preferably, but not necessarily, to refer to an indirect plasma corona treatment. The surface is preferably treated at or close to atmospheric pressure, although the pressure between discharge space or gas channel may be increased; especially in the cases present here when using ambient air as process gas, the air may also be forced through the process gas channel with a pressure of 5 to 6 bar. As a result of the electrical discharges and as a result of ionization processes in the electrical field, the gas is activated, and highly excited states of the gas constituents are produced. The gas used is referred to as process gas. In accordance with the invention the process gas is preferably ambient air, but may also be another gas such as helium or nitrogen, for example.

The species formed by the plasma include electrons and ions. They strike the surface of the pressure-sensitively adhesive material strand, with energies which are sufficient to break up the majority of the molecular bonds located on the surface of the material strand. This leads initially to improved "wettability" of the surface, meaning that the molecular cohesion force of fluids changes in relation to the adhesion force on the surface.

The reactivity of the reactive gas constituents which also form when the molecular bonds are broken is a subsidiary effect. The broken molecular bonds on the surface of the material strand then react further with constituents of the air or of the process gas.

Since indirect plasma treatment means that there is no direct effect of the electrical field that generates the plasma on the surface, this type of plasma treatment is gentler to material. This also applies to the reactive gas constituents, which have predominately likewise reacted with the air constituents or with the process gas before they have reached the surface of the material strand. In the case of indirect plasma treatment, there are possibly free electrons present, but they are not accelerated, since the treatment occurs outside the generating electrical field, with likewise gentle effects on material.

One advantage of the method of the invention is that it is possible to provide adhesive filaments which consist of a pressure sensitive adhesive, but can be employed in existing manufacturing plants for thermoplastic filaments. Depending on the manufacturing machines, it may be necessary here to adapt individual machine parameters in order to improve or to enable the processing of the adhesive filament.

Further advantages of the method of the invention are that it is cost-effective and can be implemented predominantly with existing and readily available components. The method of the invention also refutes the prejudices of the skilled person that pressure-sensitive adhesive materials are not suitable for manufacturing machines on the principle of fused deposition model, since such materials cannot be conveyed or they stick in a manufacturing machine. The method of the invention may advantageously be developed by depositing a passivating layer by means of the plasma stream on the at least one subregion of the surface of the material strand. One or more precursors may be admixed to the process gas. For this purpose a precursor is vaporized and introduced into the plasma stream by means of a carrier gas. The carrier gas is preferably inert and does not react with the precursor or with the broken molecular bonds on the surface of the material strand. The molecular bonds situated on the surface of the material strand react with the at least one precursor. By means of a precursor it is possible to achieve a further improvement in the passivating properties, i.e., the reduction in the tack of the plasma stream by application of a passivating layer on the surface.

The precursor preferably comprises silanes or siloxanes. One advantage is that silanes and siloxanes have poor wettability. The precursor preferably comprises organic, polyfunctional silanes. A precursor usefully used is hexamethyldisiloxane (HMDSO), which is supplied to the process gas in an order of magnitude of 10 g/h to 150 g/h or 20 g/h to 150 g/h or 40 g/h to 150 g/h. The HMDSO is vaporized in an evaporator at about 120° C., and the precursor gas escaping the evaporator is supplied to a nozzle head and combined within the nozzle head with the process gas. In this case the precursor passes with the plasma stream onto the surface of the material strand that is to be treated. Instead of HMDSO, however, it is also possible for aminopropyltriethoxysilane or perfluorooctyltriethoxysilane or (3-glycidyloxypropyl)trimethoxysilanes (GLYMO) or octyltriethoxysilane (OCS) to be used. Preference is given to using polyfunctional silanes. Where chlorosilanes and chloroalkylsilanes are used as precursors, fumed silicas can be deposited on the surface of the material strand.

Apart from the aforesaid substances, other layer-forming starting substances can also be employed advantageously as precursors. Advantageous substances include acrylic acid or silicic esters, such as, for example, tetraethyl orthosilicate, or perfluorodecanoic acid or solvents.

An advantageous feature of a deposited passivating layer is that the layer is just a few tens to hundreds of nanometers thick. The coating usefully has a very largely consistent thickness, preferably constant thickness, over the entire extent of the adhesive tape side. The thickness of the coating is preferably between 60 nm and 600 nm; more preferably the thickness is between 100 nm and 300 nm. The layer, advantageously, on account of the low thickness, is flexible and is barely abraded or caused to delaminate by mechanical exposure when the adhesive filament is being moved, conveyed or bent. Such exposures occur, for example, when the adhesive filament is being wound onto a roll or redirected within a manufacturing machine or conveyed by drive rollers. The low thickness is additionally advantageous since the adhesive filament has only a small fraction of additional, nonadhesive material added to it. The fraction of the passivating layer is typically only 0.01 wt % to 5 wt %. The low weight fraction has only little effect, or none at all, on the properties of the pressure sensitive adhesive, especially the peel adhesion. The effects on the chemical and adhesive properties of the pressure sensitive adhesive arising from the passivating layer are therefore negligibly small.

The method of the invention may advantageously be developed by virtue of the passivating layer being an SiOx coating, more particularly a coating of $SiO_2$ or $SiO_3$. A passivating layer of SiOx may advantageously be used in order to reduce the tack. The SiOx coating is itself not pressure-sensitively adhesive, and through the sheathing of the material strand it masks the pressure-sensitive adhesive surface of the material strand. As a result, the adhesive filament can then be easily handled and processed without sticking.

A further surprising advantage of an SiOx coating is that the passivating layer of SiOx possesses a barrier effect. Accordingly, even a thin passivating layer, with the thicknesses referred to above, prevents moisture penetration into the pressure sensitive adhesive, since gaseous water is barely able to penetrate the passivating layer. In other words, the passivating layer has the effect of lowering the water vapor transmission rate. As a result of the barrier effect of the passivating layer, however, the penetration of other gases into the pressure sensitive adhesive as well, as a result of diffusion processes, for example, is lessened. Because the passivating layer reduces the penetration of water, moisture and oxygen, there is an advantageous prolongation of the shelf life of the adhesive filament, since aging processes to the pressure sensitive adhesive that are caused by water and oxygen can be slowed.

Provision may also be made for a passivating layer of SiOx to be established in such a way that it has hydrophobic properties. When passivated surface regions of the material strand are wetted with water, such as water splashes or water condensation, this water beads off to a large extent from the adhesive filament. By means of a passivating layer of SiOx, therefore, extensive water wetting of the surface can be prevented, such water otherwise dwelling on the surface and affecting the pressure sensitive adhesive.

A further advantage of the passivating layer of SiOx on the material strand is that, as a result of the reduced tendency to absorb moisture, the adhesive filament can be processed more effectively in a processing machine. Absorption of moisture may cause a rise in the diameter of the adhesive filament, so increasing the risk of the adhesive filament becoming blocked in the processing machine and then tilting and/or kinking. Further processing problems may likewise be avoided or reduced as a result of the passivating layer of SiOx. If an adhesive filament absorbs moisture, for example by the moisture in the ambient air, a possible consequence is that the moisture absorbed is released during melting in the extruder die of the processing machine. As a result of the high temperature in the extruder die, typically between 130° C.-280° C., the water vapor greatly expands and leads to a pressure increase within the extruder die. A typical consequence of this is the sudden increased extrusion of material from the extruder die; the skilled person knows this phenomenon as overextrusion, meaning that the flow of material is no longer uniform and the surface quality of a printed element is greatly reduced. Moreover, as a result of the pressure differences, the extruder die has a tendency toward partial or complete blockage, leading to underextrusion and again a reduction in the surface quality of a printed element. Complete blockage of the extruder die even leads to shutdowns of the manufacturing machine in order for the extruder die to be cleaned. These problems may be prevented or reduced by the aforesaid passivating layer of SiOx, since the absorption of moisture could be reduced or even avoided by the passivating layer.

The advantageous effects of a passivating layer occur not only for a material strand fully clad with a passivating layer, but also in the case of a material strand only partially clad with a passivating layer.

The method of the invention may advantageously be developed if the plasma stream emerging from the opening of the plasma nozzle is redirected by means of a baffle element, and the redirected plasma stream flows over the at least one subregion of the surface of the material strand. The plasma nozzle and the baffle element are preferably arranged in such a way that the plasma stream emerging from the plasma nozzle flows completely around the material strand.

In spite of the material-preserving qualities of indirect plasma treatment as already elucidated above, the plasma stream may give rise locally to temperatures of, in a favorable case, at least 100° C., possibly reaching up to several hundred degrees, on the surface of the material strand of pressure sensitive adhesive. If the material strand is not just exposed briefly to the plasma stream, but instead a critical residence time is exceeded, there is a high input of thermal energy into the at least one subregion of the surface of the pressure sensitive adhesive. This energy input may then result in the pressure sensitive adhesive being softened or even liquified, and the already shaped material strand loses its shape or even breaks and is destroyed.

Provision may therefore be made, in accordance with the invention, to expose the at least one subregion—to be treated—of the surface of the material strand not directly to the plasma stream coming from the plasma nozzle, but instead to redirect the plasma stream at a baffle element. The baffle element may be a horizontal, preferably metallic surface, or alternatively a spherical, hemispherical or sphere-segment-shaped internal or external surface on which the plasma stream emerging from the opening of the plasma nozzle impinges. As a result, the plasma stream can also be redirected in different directions and divided.

Only after the redirection of the plasma stream does it impinge on the material strand. A baffle element may comprise, for example, a sheet of a suitable material, or else a solid material element, such as a pad or block of a suitable material, for example. Hollow elements as well, through which the material strand is guided, such as a tube, may be used. A baffle element may have a layer of a further material on its surface exposed to the plasma stream. A part or the entirety of the redirected plasma stream then impinges on the at least one subregion of the surface of the material strand, as a result of the redirection under an angle between 1° and 90°. In this context, angles between 10° to 80° are advantageous; particularly advantageous are angles in the range between 15° to 45°, although any other angle, more particularly one between the aforesaid stated angles, may be provided and is hereby also disclosed. The stated angle represents the sum of the incident angle and of the emergent angle of the plasma stream. The incident angle is to be understood as the angle relative to a perpendicular to the surface of the baffle element, under which the plasma stream moves toward the surface of the baffle element; the emergent angle should be understood as the angle relative to a perpendicular to the surface of the baffle element under which the plasma stream diverges from the baffle element.

Because of the redirection, the plasma stream has significantly less thermal energy than the plasma stream striking the surface directly. In particular, the redirected plasma stream is only able to heat the at least one subregion of the surface to an extent which rules out thermal destruction of the material strand. Surprisingly it has emerged that the activation by the plasma stream of the at least one subregion of the surface of the material strand is retained even after the plasma stream has been redirected. Similarly, when a precursor is fed into the plasma stream, the reduction in tack by the plasma stream is retained even after the redirection of the plasma stream. The effect of the plasma treatment therefore continues even when the plasma stream is redirected before impinging on the surface of the material strand.

The method of the invention may advantageously be developed in that the plasma stream is redirected by at least two baffle elements, more particularly such that a first baffle element redirects the plasma stream emerging from the opening of the plasma nozzle into a first direction, and a second baffle element redirects the plasma stream into a second direction. The use of plural baffle elements makes it possible to orient the plasma stream in a more targeted way, and/or to reduce the thermal energy of the plasma stream not only via the path length but also via the additional baffle surface. In this case the first and second baffle elements may be arranged in such a way that the plasma stream is first redirected by the first baffle element in the direction of the second, for the second baffle element to redirect the plasma stream in the direction of the material strand, to cause it to flow over the material strand at least on one subregion of said strand. It may also be preferable for the first and second baffle elements to divide the plasma stream emerging from the plasma nozzle and to pass the divided stream in different directions over at least one subregion of the material strand.

The method of the invention may advantageously be developed in that the plasma stream emerging from the opening of the plasma nozzle is redirected by a baffle element in such a way that the plasma stream flows very largely tangentially around the surface of the material strand. For example, the design of the baffle element may be such that it guides the plasma stream on a tangential or at least sectionally tangential path around the longitudinal direction of the material strand. The emerging plasma stream usefully flows tangentially around the material strand. A tangential surround flow of this kind may be achieved, for example, by orienting the plasma nozzle perpendicular to the longitudinal direction of the material strand, with the surface normal of the cross section of the exit opening of the plasma nozzle not having the same direction as an arbitrary surface normal of the material strand. A tangential surround flow may also comprehend a helical surround flow. A helical surround flow results in particularly efficient flow around the surface of the material strand, since the plasma stream flows around the material strand at least once, but preferably a number of times. In this case, preferably, the material strand around which flow is to take place is located concentrically with respect to the helical flow. Accordingly it is possible to achieve uniform and all-round passivation of the pressure-sensitive adhesive surface.

The method of the invention may advantageously be developed by the cooling of the baffle element. To reduce the thermal input into the material strand, provision may be made for passive or active cooling of the baffle element. Passive cooling measures in this context may be the provision of cooling surfaces or cooling ribs on parts of the baffle element, or the coating of parts of the baffle element with a heat-deflecting paint or with anodized aluminum, in order to reduce the coefficient of thermal transfer between the ambient air and the material of the baffle element. A correspondingly solid embodiment which permits thermal conduction may likewise be envisaged. An active cooling measure may be the forced removal of thermal energy absorbed in the baffle element, such as the removal of the energy by means of a fan, for example. Provision may also be made for the cooling of the baffle element by means of a fluid, such as water, oil or nitrogen, for example. The passive or active cooling of the baffle element reduces the thermal energy input into the material strand, with the consequent possibility of preventing softening or breaking and destruction of the material strand. In the case of active cooling, moreover, an advantage is that it is possible to adjust the amount of energy removed from the baffle element. This can be achieved, for example, by altering the flow rate of a fluid or the rotary speed of a fan. This allows the plasma temperature to then be controlled or regulated in a targeted way.

The method of the invention can advantageously be developed in that the at least one subregion of the surface of the material strand is treated under a reduced pressure. Treatment under reduced pressure has the advantage that fewer organic residual groups are involved in the reaction of the precursor with the surface of the material strand. One consequence of this is that the thickness of the passivating layer becomes more uniform. Secondly, greater thicknesses of the passivating layer are thus also enabled.

The method of the invention may advantageously be developed in that in a further step a passivating agent is applied, the passivating agent being applied on another part of the surface of the material strand. Further to the treatment of the material strand by a plasma stream, it is possible in a further step for the material strand to be powdered with a passivating agent. A passivating agent may be any powderous or flourlike material which adheres on the surface of the material strand and reduces the tack of the surface. The passivating agent itself here is not sticky. The additional passivating agent may be advantageous, since through additional powdering it is possible to ensure that the complete surface of the material strand no longer has any tack. In the course of the subsequent powdering, the preferably pulverulent powdering material adheres predominantly to those locations on the surface of the material strand at which the material strand has not been treated, or not completely treated, with the plasma stream. A small part of the powdering material possibly also adheres to parts of the surface of the material strand at which treatment with the plasma stream has taken place beforehand, with the adhesion to these parts of the surface of the material strand being low. Passivating agents suitable advantageously are talc or pulverulent chalk or fumed silica or quartz flour or limestone flour or ground feldspar or ground mica. The passivating agent may comprise one or more of these substances or may consist exclusively of one of these substances.

An advantageous feature is that the powdering additionally to the plasma treatment ensures that the adhesive filament cannot stick, though only a small amount of powdering material is needed, as it adheres selectively only to pressure-sensitively adhesive parts of the surface of the material strand. As a result, on the one hand, the amount of powdering material required is reduced; on the other hand, when the adhesive filament is processed in an extruder die, only a small fraction of additional material enters the pressure sensitive adhesive, with therefore only a slight effect on the properties of the pressure sensitive adhesive.

The method of the invention may advantageously be developed in that in a further step the adhesive filament is wound onto a winding core. Accordingly, the adhesive filament is brought into a form in which to start with it can be particularly well transported and stored in a space-saving manner. Furthermore, a winding core is especially suitable for being used in an existing processing machine, since the existing plastic filaments are likewise unwound from winding cores.

The object is achieved in a second aspect by an adhesive filament having the features set forth herein. Advantageous developments are also set forth herein.

Accordingly the invention relates to a filament of adhesive comprising a pressure sensitive adhesive and a passivating layer, wherein the pressure sensitive adhesive has the form of a material strand, and the passivating layer is deposited on at least one part of the surface of the material strand (1). Regarding the properties and advantages of the adhesive filament of the invention, reference may be made to the observations above.

The pressure sensitive adhesive may further comprise at least one filler. Fillers make it possible to adjust the mechanical and/or chemical properties of the adhesive filament. The filler preferably comprises fumed silica, quartz flour, limestone flour, ground chalks, feldspar, talc, mica or solid glass beads. These materials are predominantly chemically inert with respect to the synthetic rubber and resin components. With further preference it is possible to use hollow glass beads. This filler has the advantage that it is chemically inert with respect to the adhesive and, moreover, has virtually no reducing effect on the tack after the processing of the adhesive filament.

The adhesive filament of the invention may advantageously be developed in that the thickness of the passivating layer is 60 nm to 600 nm, preferably 100 nm to 300 nm. Regarding the properties and advantages of the adhesive filament of the invention, reference may be made to the observations above.

The adhesive filament of the invention may advantageously be developed in that the passivating layer comprises $SiO_x$, more particularly $SiO_2$ or $SiO_3$. Regarding the properties and advantages of the adhesive filament of the invention, reference may be made to the observations above.

The adhesive filament of the invention may advantageously be developed in that the surface of the material strand at least partly has a passivating agent, more particularly in that the surface of the material strand at least partly has a passivating agent which comprises talc or pulverulent chalk or fumed silica or quartz flour or limestone flour or ground feldspar or ground mica. The passivating agent may comprise one or more of these substances or may consist exclusively of one of these substances.

The adhesive filament of the invention may advantageously be developed in that the diameter of the adhesive filament is 1.75 mm±0.15 mm or 2.85 mm±0.25 mm or 3.0 mm±0.25 mm. These diameters are particularly advantageous because existing manufacturing machines are preferably able to process these diameters without adaptation of the machines. Particular preference may be given to a nominal diameter of 1.75 mm or less, since a thinner adhesive filament results in a lower backpressure in the extruder die and therefore in a reduced load on the extruder die. It may also be preferable for the adhesive filament to have a nominal diameter of 2.85 mm or 3.00 mm or greater, since in that case the adhesive filament has less of a tendency to stretch and/or compress when the adhesive filament is being conveyed in a manufacturing machine during processing.

The adhesive filament of the invention may advantageously be developed in that the pressure sensitive adhesive comprises at least one filler. Fillers make it possible to adjust the mechanical and/or chemical properties of the adhesive filament. The filler preferably comprises fumed silica, quartz flour, limestone flour, ground chalks, feldspar, talc, mica or solid glass beads. These materials are predominantly chemically inert with respect to the synthetic rubber and resin components. With further preference it is possible to use hollow glass beads. This filler has the advantage that it is chemically inert with respect to the adhesive and, moreover, has virtually no reducing effect on the tack of the after the processing of the adhesive filament.

According to a third aspect, the invention relates to an adhesive roll, with an aforesaid adhesive filament of the invention. This adhesive roll has a winding core, with the adhesive filament being wound on the winding core. Since, as a result of the aforesaid treatments, the adhesive filament is no longer pressure-sensitively adhesive on the surface, it is possible to wind a plurality of superposed plies on the winding core. In this way the adhesive filament can be particularly effectively transported and space-savingly stored, on the one hand. On the other hand, an adhesive roll of this kind is especially suitable for providing the adhesive filament in an existing processing machine, since existing processing machines likewise unwind plastic filaments from rolls. Consequently no adaptations or just a few adaptations to existing processing machines are needed.

According to a fourth aspect, the invention relates to a printed element which consists of or comprises an adhesive filament of the invention. A printed element is an element which consists wholly or partly of the adhesive filament. For this purpose, the adhesive filament has been melted in an extruder head in a processing machine and has been deposited by an extruder die onto a construction substrate, on which the melted adhesive filament of the invention then solidifies again. As a result of the melting of the adhesive filament, the passivating layer and, where appropriate, the passivating agent have been combined with the adhesive. As a result, the passivating layer and, where appropriate, the passivating agent are no longer located on the surface, and the pressure sensitive adhesive is pressure-sensitively adhesive again on its surface. Alternatively, a printed element may also be deposited directly on a component and applied there in at least one ply.

The printed element should be understood as a printed adhesive element, i.e. a printed pressure-sensitively adhesive element. Through the production of a printed element, as described here, in a printing operation in accordance with the fused deposition modeling process, and wherein the adhesive filament described here is processed, the printed element or printed adhesive element can be produced in a wide variety of different geometric shapes.

The invention is described with reference to various examples in FIGS. 1a), 1b), 2, and 3a)-3f). Identical elements are given the same reference symbols. In the figures, FIGS. 1a) and 1b) show cross sections through adhesive filaments of the invention;

FIGS. 3a)-3f) show illustrative embodiment and arrangement of baffle elements for the plasma treatment of a pressure-sensitively adhesive material strand.

Figure 1:
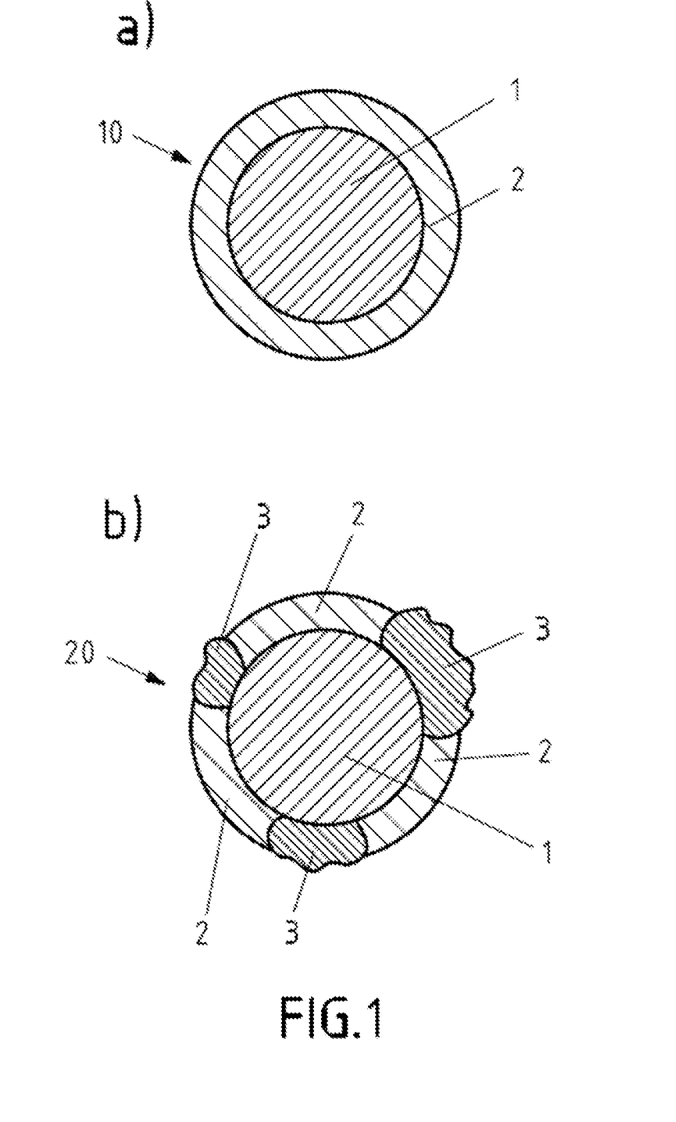

FIG. 1a) shows by way of example a cross section, not to scale, through an adhesive filament 10 of the invention. The cross section is located perpendicularly to the longitudinal direction of the adhesive filament. The adhesive filament 10 consists of a pressure sensitive adhesive 1, shaped into a material strand, and a passivating layer 2. Applied by plasma treatment on the material strand of pressure sensitive adhesive 1 is a passivating layer 2. The passivating layer fully surrounds the material strand of pressure sensitive adhesive 1, and passivates the surface. The thickness of the passivating layer is several 100 nm and is very small in relation to the diameter of the adhesive filament (representation not to scale). The diameter of the adhesive filament is typically 1.75 mm or 2.75 mm or 3.0 mm. A material strand may also, however, have different diameters, especially diameters situated between the aforementioned diameters. The advantageous diameters are also a factor of the manufacturing machines employed. These machines are frequently configured for a particular diameter of a material strand.

In contrast to FIG. 1a), FIG. 1b) shows an adhesive filament 20 in which not the entire surface of the material strand of pressure sensitive adhesive 1 has been passivated in the plasma treatment, by the application of a passivating layer 2 on the material strand of pressure sensitive adhesive 1 (representation not to scale). Consequently, subregions of the surface of the pressure-sensitively adhesive material strand continue to be pressure-sensitively adhesive. On the pressure-sensitively adhesive regions, the adhesive filament 20 bears a layer of passivating agent 3. The adhesive filament 20 is therefore also passivated on the regions which may have no passivating layer or only an incomplete passivating layer. As a result of the additional application of a passivating agent 3, the resulting adhesive filament 20 is sufficiently passivated to be processed in a manufacturing machine. Furthermore, the adhesive filament 20 has the same properties as the adhesive filament 10 from FIG. 1a).

Figure 2:
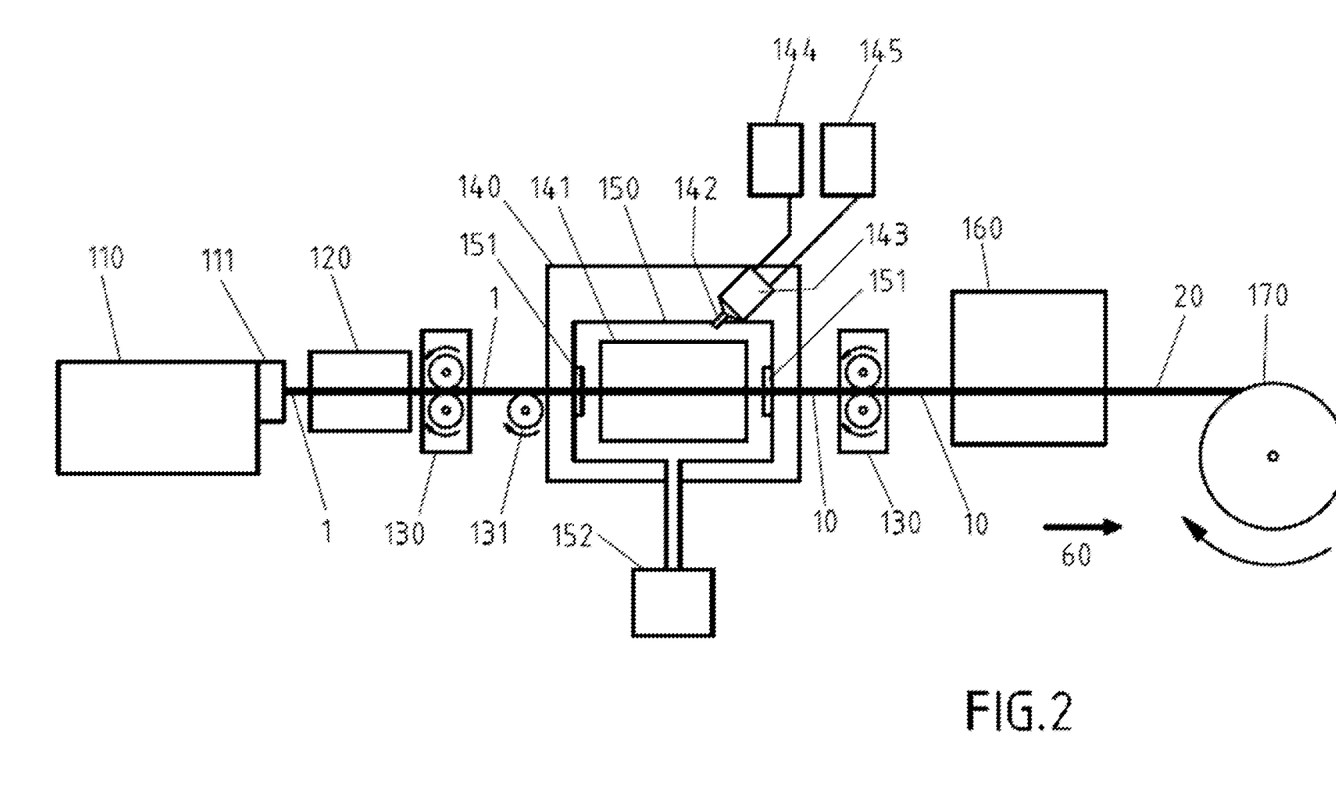
FIG. 2 shows an illustrative production method for an adhesive filament of the invention which is not externally pressure-sensitively adhesive.

Represented in FIG. 2 by way of example is a method for producing an adhesive filament 10, 20. An extruder 110 provides the pressure sensitive adhesive, by combining the constituents described above in the extruder with one another and processing them. The pressure sensitive adhesive is subsequently pressed through an extrusion tool 111 and brought, for example, into the form of a material strand 1. The extruded material strand 1 can then be cooled in a cooling unit 120; cooling of the material strand is not necessary in every case. Cooling is accomplished preferably by a water bath or by sprinkling with water or by atomization of water. A takeoff unit 130 takes the material strand 1 of pressure sensitive adhesive off at a defined velocity and supplies it via further guide rollers 131 to a treatment unit 140. The velocity at which the material strand 1 is taken off is typically between 50 mm/s to 500 mm/s. The rollers of the takeoff unit 130 are made of a material on which the pressure sensitive adhesive adheres only slightly or not at all. Alternatively the rollers of the takeoff unit 130 may also have been coated with a nonadhesive coating, e.g., a nonstick coating. In the treatment unit 140, the material strand which externally is still pressure-sensitively adhesive is passivated by means of a plasma treatment. For this purpose, the plasma stream emerging from a plasma nozzle 142 is passed over the surface of the pressure-sensitively adhesive material strand 1. The plasma is generated in a plasma generator 143, by a corona discharge, for example. For this purpose a process gas 144 is passed into the plasma generator 143 in which the plasma is generated. Additionally, in a precursor unit 145, a precursor gas 144 is provided and is supplied to the emerging plasma. The mixture then emerges from the plasma nozzle 142 and forms a plasma stream. The arrangement of the plasma nozzle 142 is such that the emerging plasma stream passes onto a baffle element 141. The baffle element 141 removes part of the thermal plasma energy from the plasma stream, causing a reduction in the temperature of the plasma stream. The baffle element 141 is also arranged in such a way that it redirects the plasma stream, causing the plasma stream to flow over or around the surface of the material strand 1. The shaping of the baffle element 141 here is selected such as to maximize the region of the surface of the material strand 1 around which or over which the stream flows. As soon as the plasma stream flows around the material strand 1, plasma treatment takes place, with the plasma stream reacting chemically with the surface of the pressure-sensitively adhesive material strand 1. Moreover, the passivating layer 2 is deposited, thereby passivating the pressure-sensitively adhesive surface of the material strand 1 and providing the adhesive filament 10.

In addition, the plasma treatment may also take place in a reduced pressure unit 150, with the advantage that the thickness of the passivating layer is formed more uniformly over the surface of the material strand. For this purpose the adhesive filament 1 is guided through a reduced pressure unit 150 which has an internal pressure of between 0.1 to 0.4 mbar. The reduced pressure unit 150 is sealed off at the entry opening and at the exit opening by means of suitable gaskets 151. The reduced pressure is generated by a suitable reduced pressure generator 152.

Provision may likewise be made, in a further step, for the adhesive filament 10, which already bears an applied passivating layer, to be guided additionally through a passivating agent unit 160. In the passivating agent unit 160, a passivating agent, quartz flour for example, is applied to the material strand 10. This passivating agent is deposited on those regions of the adhesive filament 10 that have no passivating layer or only an incomplete passivating layer.

In a further step, the adhesive filament 10, 20 can be wound in a winding unit 170, onto a spool body, for example, in order for the adhesive filament 10, 20 to be stored or provided to a manufacturing machine.

Figure 3:
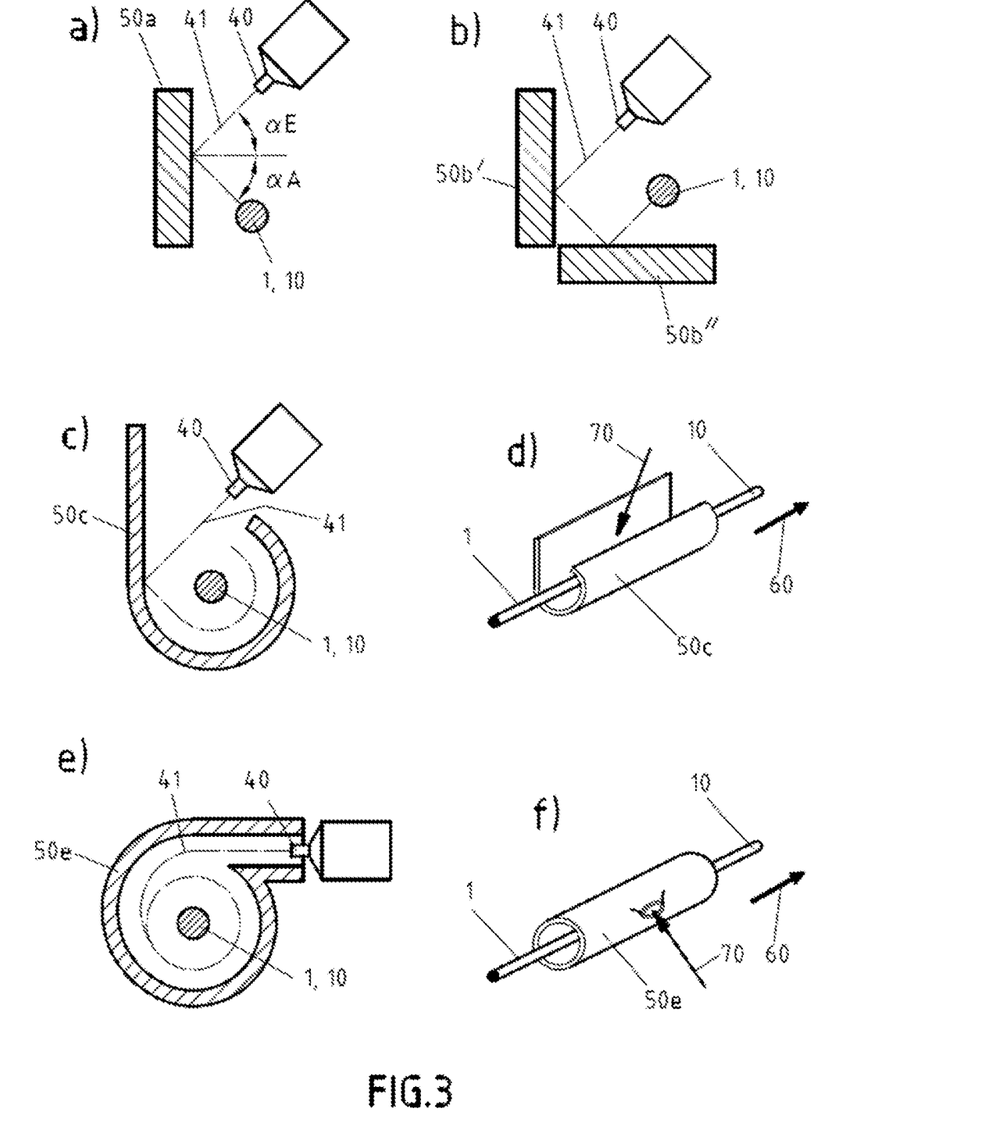

FIGS. 3a)-3f) show sections through different embodiments of possible baffle elements 50a to 50e. Depicted in each case is a plasma stream 41 emerging from a plasma nozzle 40. The course of the plasma stream 41 is indicated by dotted lines. It is noted that this dotted line does not reproduce the complete course of the layer of the plasma stream 41, instead merely reproducing schematically the course of the major part of the plasma stream 41. By means of one or more baffle elements 50*a* to 50*e*, the plasma stream 41 is redirected and, as a result of the redirection, is guided onto the material strand 1 in order to passivate the material strand 1.

FIG. 3*a*) shows a cross section through a single baffle element 50*a*. It is formed of a heat-conducting material and in this embodiment is configured as a solid body. The plasma stream 41 emerging from the plasma nozzle 40 strikes the surface of the baffle element 50*a* at an incident angle $\alpha_E$. The incident angle is defined by the angle between the perpendicular to the surface of the baffle element 50*a* and the flow direction of the plasma stream 41. As a result of its impinging on the baffle element 50*a*, the plasma stream 41 transfers thermal energy to the baffle element 50*a*, causing the plasma temperature to drop. Furthermore, the plasma stream 41 is redirected by the baffle element 50*a*, and is thereby reflected from the baffle element 50*a* under the angle $\alpha_A$. The angle $\alpha_A$ is defined as the angle between the perpendicular to the surface of the baffle element 50*a* and the direction of the redirected plasma stream 41. The plasma stream 41 behaves substantially in accordance with the law of reflection. The redirected plasma stream 41 then impinges on the material strand and flows around it, causing a passivating layer 2 to form on the surface of the material strand 1.

In FIG. 3*b*), in contrast to FIGS. 1*a*) and 1*b*), the plasma stream 41 is redirected via two baffle elements 50*b*'. The plasma stream 41 initially impinges on a first baffle element 50*b*', which redirects it into a first direction. At the same time there is a reduction in the thermal energy of the plasma stream 41. As a result of the directional change of the plasma stream 41, the plasma stream is passed onto a second baffle element 50*b*". This further reduces the thermal energy of the plasma stream 41. The second baffle element 50*b*" then redirects the plasma stream 41 in such a way that the plasma stream 41 flows around the material strand 1 of pressure sensitive adhesive, thus forming a passivating layer 2 on the surface of the material strand 1.

In FIG. 3*c*), the plasma stream 41 emerging from the plasma nozzle 40 is redirected by a baffle element 50*c* which is configured as a shaped guide plate. As a result of the shaping of the plate, the plasma stream 41 is guided almost once completely around the material strand 1. Moreover, the area over which the plasma stream 41 comes into contact with the baffle element 50*c* is particularly large, allowing the thermal energy to be reduced with particular efficiency. The plate preferably has a length of a few centimeters up to a few 10 centimeters, and surrounds the material strand 1 in substantially a U shape.

FIG. 3*d*) shows a perspective representation of the baffle element 50*c* from FIG. 3*c*). The material strand 1 can be placed from above into the baffle element 50*c* without contacting the baffle element 50*c*. The arrow depicted indicates the direction from which the plasma stream 41 enters the baffle element 50*c*. After having flowed around the material strand 1, the plasma stream emerges predominantly at the end faces of the substantially U-shaped baffle element 50*c* (not shown).

FIG. 3*e*) shows a cross section through a tubular baffle element 50*e*, on which an inlet opening is formed tangentially, in addition to the two end-face tube openings. The material strand 1 is passed through the interior of the tubular baffle element 50*e*. As a result of the tangential inlet opening, the plasma stream 41 is passed into the interior of the tubular baffle element 50*e*. The baffle element 50*e* may be divided into two parts along its longitudinal direction, namely the direction in which the material strand 1 is guided through it. The design of the two parts may be such that they are for example plugged into one another or are joined foldably via one or more hinges. This makes it easier to guide the material strand 1 through the tubular baffle element 50*e*. Alternatively the baffle element may also have a slot to facilitate introduction of the material strand 1. In that case the slot is formed along the longitudinal axis of the baffle element 50*e*, in other words along the axis along which the material strand 1 is guided through the baffle element 50*e*. Accordingly the material strand 1 can be inserted into the baffle element 50*e*, rather than the pressure-sensitively adhesive material strand 1 being guided through the tube. Additionally, in the interior of the tubular baffle element 50*e*, flow disruptor elements (not shown) may be mounted. These flow disruptor elements generate a turbulent flow of the plasma stream 1 within the tubular baffle element 50*e*. The eddies which form as a result of the turbulent flow improve the efficiency with which the plasma stream 41 passivates the pressure-sensitively adhesive material strand 1.

FIG. 3*f*) shows a perspective representation of the baffle element 50*e* from FIG. 3*e*). The material strand 1 is guided through the tubular baffle element 50*e*. The arrow depicted indicates the direction from which the plasma stream 41 enters the tubular baffle element 50*e*. After having flowed around the material strand 1, the plasma stream 41 emerges at the end faces of the tubular baffle element 50*e* (not shown in the drawings).

LIST OF REFERENCE SYMBOLS

1 Strand of pressure sensitive adhesive material
2 Passivating layer
3 Passivating agent
10 Adhesive filament
20 Adhesive filament
40 Plasma nozzle
41 Plasma stream
50*a* Baffle element
50*b*', 50*b*" Baffle elements
50*c* Baffle element
50*e* Baffle element
60 Direction of movement
70 Direction of plasma stream
110 Extruder
111 Extrusion die
120 Cooling unit
130 Takeoff unit
131 Guide roller
140 Treatment unit
141 Baffle element
142 Plasma nozzle
143 Plasma generator
144 Process gas
145 Precursor unit
150 Reduced pressure unit
151 Gasket
152 Reduced pressure generator
160 Passivating agent unit
170 Winding unit

The invention claimed is:
1. A method for producing a filament of adhesive from a pressure sensitive adhesive, the method comprising:
   a) providing the pressure sensitive adhesive;

b) shaping the pressure sensitive adhesive into a material strand having a surface;

c) treating at least one subregion of the surface of the material strand with a plasma stream, the plasma stream emerging from an opening of a plasma nozzle and being passed over the at least one subregion of the surface of the material strand, wherein, through the plasma stream, a passivating layer is deposited onto the at least one subregion of the surface of the material strand; and d) applying a passivating agent to the material strand, wherein the passivating agent comprises talc or pulverulent chalk or fumed silica or quartz flour or limestone flour or ground barite or ground mica, wherein the at least one subregion of the surface of the material strand is treated under a reduced pressure between 0.1 to 0.4 mbar.

2. The method of claim 1, wherein the passivating layer is an SiOx coating.

3. The method of claim 1, wherein the plasma stream emerging from the opening of the plasma nozzle is redirected by means of a baffle element and the redirected plasma stream flows over the at least one subregion of the surface of the material strand.

4. The method of claim 3, wherein the plasma stream is redirected by at least two baffle elements such that a first baffle element of the at least two baffle elements redirects the plasma stream emerging from the opening of the plasma nozzle into a first direction, and a second baffle element of the at least two baffle elements redirects the redirected plasma stream into a second direction.

5. The method of claim 1, wherein the plasma stream emerging from the opening of the plasma nozzle is redirected by a baffle element such that the plasma stream flows tangentially around the surface of the material strand.

6. The method of claim 5, further comprising:
e) cooling the baffle element.

7. The method of claim 1, wherein the material strand is shaped from the pressure sensitive adhesive in step b) by an extrusion process.

8. The method of claim 1, further comprising:
e) winding the adhesive filament onto a winding core.

9. An apparatus for implementing the method of claim 1, the apparatus comprising:
a shaping element for shaping the pressure sensitive adhesive of claim 1; and
a treatment apparatus for treating a part of the surface of the material strand with the plasma stream.

10. A filament of adhesive, comprising:
a pressure sensitive adhesive; and
a passivating layer comprising $SiO_2$ or $SiO_3$, wherein the pressure sensitive adhesive has the shape of a material strand and the passivating layer is deposited on at least one part of a surface of the material strand under a reduced pressure between 0.1 to 0.4 mbar such that a thickness of the passivating layer is formed uniformly over the at least one part of the surface of the material strand; and
a passivating agent applied on another part of the surface of the material strand and comprising talc or pulverulent chalk or fumed silica or quartz flour or limestone flour or ground barite or ground mica.

11. The adhesive filament of claim 10, wherein a thickness of the passivating layer is 60 nm to 600 nm.

12. The adhesive filament of claim 10, wherein a total diameter of the adhesive filament is 1.75 mm±0.15 mm or 2.85 mm±0.25 mm or 3.0 mm±0.25 mm.

13. The adhesive filament of claim 10, wherein the pressure sensitive adhesive comprises at least one filler comprising fumed silica or quartz flour or limestone flour or ground chalks or barite or talc or mica or solid glass beads or hollow glass beads.

14. A roll of adhesive comprising:
the adhesive filament of claim 10; and
a winding core,
wherein the adhesive filament is wound around the winding core.

15. A printed element comprising:
the adhesive filament of claim 10.

* * * * *